United States Patent [19]
Furuno

[11] Patent Number: 5,249,005
[45] Date of Patent: Sep. 28, 1993

[54] PROJECTION IMAGE SYSTEM AND ASSEMBLING SYSTEM THEREFOR

[75] Inventor: Takashi Furuno, Tokyo, Japan

[73] Assignee: Pioneer Electronic Corporation, Tokyo, Japan

[21] Appl. No.: 752,865

[22] Filed: Aug. 30, 1991

[30] Foreign Application Priority Data

Sep. 3, 1990 [JP] Japan .................. 2-234249

[51] Int. Cl.⁵ .............................. G03B 21/60
[52] U.S. Cl. .......................... 353/94; 353/30; 353/119; 358/60; 358/231; 359/460
[58] Field of Search ............... 353/94, 30, 74, 79, 353/119; 358/60, 231; 359/449, 460

[56] References Cited

U.S. PATENT DOCUMENTS

| | | | |
|---|---|---|---|
| 3,909,525 | 9/1975 | Fagan | 353/30 |
| 4,866,530 | 9/1989 | Kalua | 358/237 |
| 4,903,137 | 2/1990 | Wakasa | 353/94 |
| 5,011,277 | 4/1991 | Ogino et al. | 353/94 |
| 5,085,495 | 2/1992 | Iwahara et al. | 358/237 |
| 5,116,117 | 5/1992 | Miyashita | 353/94 |

FOREIGN PATENT DOCUMENTS

2203586 10/1988 United Kingdom.
2236447 4/1991 United Kingdom.

*Primary Examiner*—William A. Cuchlinski, Jr.
*Assistant Examiner*—William C. Dowling
*Attorney, Agent, or Firm*—Kane, Dalsimer, Sullivan, Kurucz, Levy, Eisele and Richard

[57] ABSTRACT

A projection image unit comprises a screen, a box-like casing arranged behind a back surface of the screen having an opening face directed to the back surface and a projector disposed in the casing so as to project an image on the screen. The casing has outside dimensions in cross-section smaller than those of the screen. A plurality of projection image units are piled in matrix in an outer frame so as to constitute a projection image system having a large screen. The outer frame unit comprises vertical frames and horizontal frames constituting the outer configuration of the outer frame unit. A horizontal frame member is disposed between the vertical frames of the outer frame unit through a gap between the vertically adjacent projection image units, and a vertical frame member is disposed between the horizontal frames of the frame unit through a gap between the horizontally adjacent projection image units. The assembling of the projection image system is carried out by utilizing a crane device movably mounted on a frame unit enclosing entirely a plurality of the projection image units.

17 Claims, 12 Drawing Sheets

PROJECTION IMAGE SYSTEM AND ASSEMBLING SYSTEM THEREFOR

BACKGROUND OF THE INVENTION

This invention relates to a projection image system and an assembling system therefor, and more particularly to a projection image system wherein a large screen is formed by piling in matrix a plurality of projection image units in vertical and horizontal directions and an assembly system for assembling such a projection image system.

Figure 25:
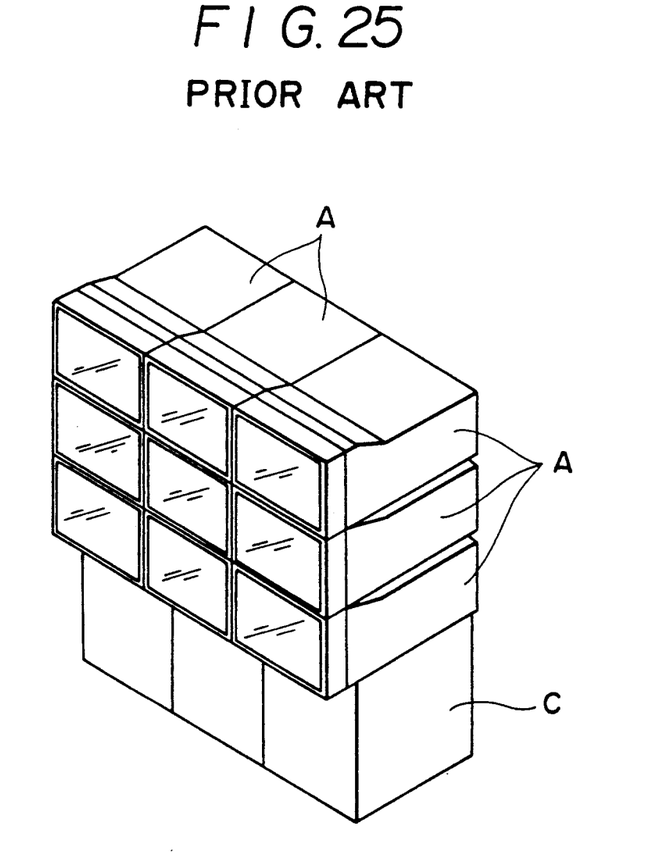
FIG. 25 is a perspective view showing a state where conventional projection image units are piled up.

Generally, projection image systems are roughly classified into two types, one being for home use and the other being for business use. In case of projection image systems for business use, the systems are often used as display systems in theaters or outdoors, and in this type of projection image systems, a large screen is formed by piling in matrix a plurality of projection image units as shown in FIG. 25.

Figure 26:
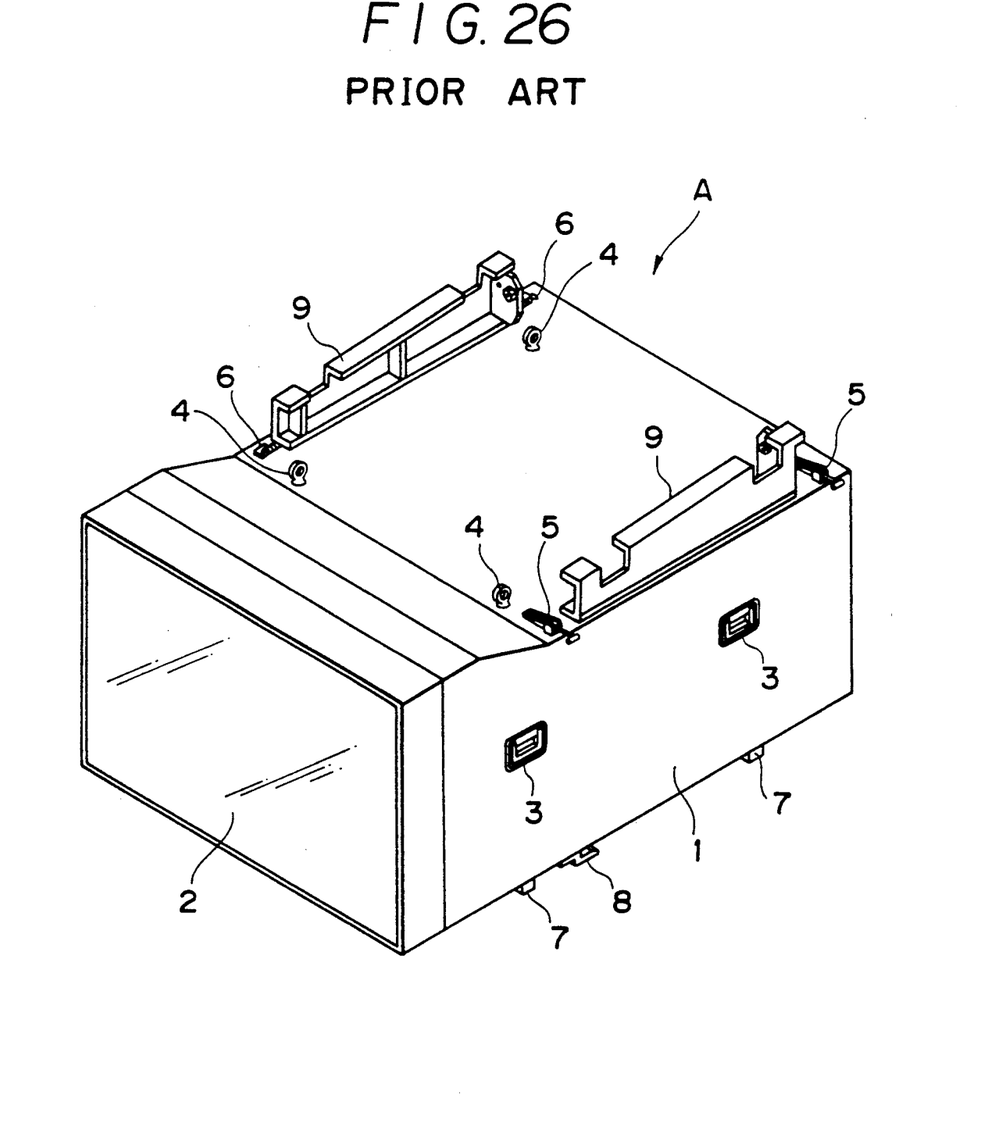
FIG. 26 is a perspective view of a conventional projection image unit.
Figure 27:
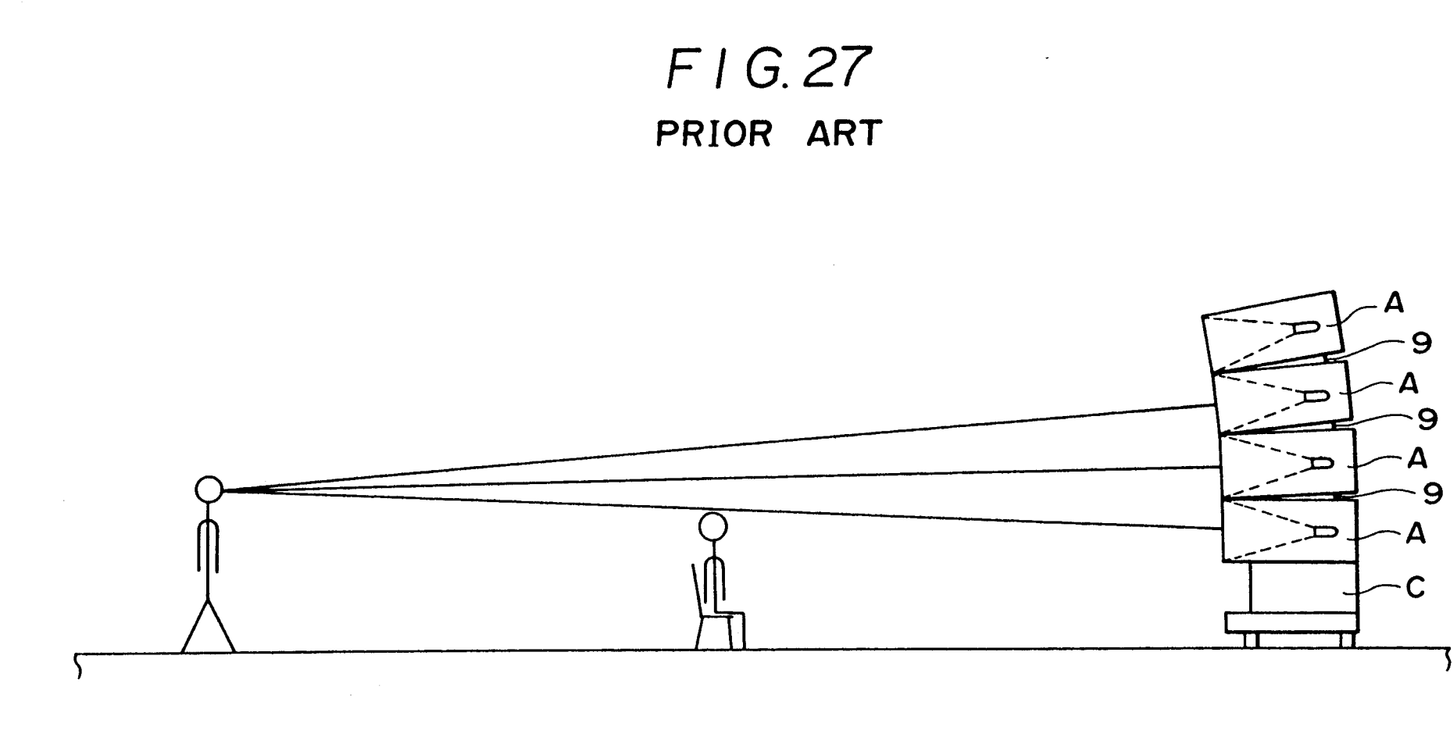
FIG. 27 is an elevation showing a state of a conventional curved screen.

FIG. 26 shows an example of a conventional projection image unit A. As shown in FIG. 26, the projection image unit A has a casing 1 having a box-like form, and a screen 2 is mounted on one end face thereof. This screen 2 consists of two lenses, one being a Fresnel lens arranged on an inner surface of the casing 1 and the other being lenticular lens. Inside from the screen 2 at a rear end thereof is incorporated a color projector, not shown, to project images on the screen 2. On the side face of the casing 1 is arranged a handle 3 for convenience of transportation, transfer and installation thereof, and on the top face of the casing 1 are arranged rings 4 for hanging the casing 1 for the same purposes as described above. A connecting fitting 5 is used to connect a projection image unit A to other projection image unit A adjoining in the horizontal direction when arranged in matrix as a pair with a step 6 arranged at the other edge of the casing 1. In brief, the connecting fitting 5 engages with the step 6 of the adjoining projection image unit A, thus projection image units A being connected with each other in the horizontal direction. The casing 1 has a top surface position in a level little lower than a top edge face of the screen 2 so that the rings 4 and the connecting fitting 5 will not constitute obstacles when projection image units A are piled up in the vertical direction and a clearance will not be present between the upper and lower edge faces of the screen 2. The projection image units A are assembled as shown in FIG. 25, but an angle of visibility for the screen 2 is limited, and when piled up in multiple stages, sometimes images on screens 2 in upper stages may be hardly seen by a viewer near the screen 2. To solve this problem, the projection image units A in upper stages are inclined so that the entire screen will be curved, as shown in FIG. 27. In this case, a spacer 9 is used between the upper and lower projection image units A. Note that examples of disclosure of conventional projection image units A are included in Japanese Laid-Open Patent Publication 1-228281 (U.S. Pat. No. 4,903,137)

One of the problems concerning the conventional projection image units A as described above is, however, that the construction and strength thereof are inadequate to form a large screen.

In other words, weight of a single projection image unit A is about 100 kg in case of heavier ones, although the weight depends on size of the screen 2. Although reduction of weight is desirable when easiness of handling is taken into account, a degree of strength is required to expand an area of the screen, which means that there is a limit in reduction of the weight. On the other hand, in order to form a large screen for such devices as high resolution televisions, demands for which have been increasing year by year, more and more projection image units A must be piled up in every direction, but in this configuration, total weight of projection image units A in upper stages is loaded to those in lower stages, and compressive load which a single projection image unit A can endure goes near the limit, resulting in the restriction for forming a large screen.

SUMMARY OF THE INVENTION

An object of this invention is to substantially eliminate the defects or drawbacks encountered in the prior art and to provide a projection image system and an assembling system therefor capable of forming or assembling a screen having a large screen surface having the same strength as that of the prior art without increasing the weight thereof.

This and other objects can be achieved according to this invention, in one aspect, by providing a projection image system comprising:

a plurality of projection image units each having a casing of box-like structure having one end provided with a screen and a projector disposed inside the casing to project an image on a back surface of the screen;

an outer frame unit enclosing the plural projection image units in a manner that the projection image units are piled in matrix so that screens of the respective projection image units are disposed in the same direction to form a large screen, the outer frame unit comprising vertical frames and horizontal frames constituting outer configuration of the outer frame unit;

at least one horizontal frame member disposed between the vertical frames of the outer frame unit so as to extend horizontally through a gap formed between vertically adjacent projection image units;

at least one vertical frame member disposed between the horizontal frames of the outer frame unit so as to extend vertically through a gap formed between horizontally adjacent projection image units; and a member for connecting the horizontal frame member and the vertical frame member at a crossing portion thereof.

In another aspect, there is provided a projection image unit comprising:

a screen having predetermined vertical and horizontal outer dimensions;

a box-like casing arranged behind a back surface of the screen and having an opening face directed to the back surface of the screen; and a projector accommodated in the casing so as to project an image on the screen, the casing having a cross-section, parallel to the opening face, having outside dimensions in vertical and horizontal directions smaller than those of the screen so that when a plurality of casings are piled up in matrix, clearances are formed between one casing and other casings adjacently arranged to that one casing in vertical and horizontal directions.

In a further aspect, there is provided an assembling system for assembling a projection image system to constitute a large screen by piling up in matrix a plurality of projection image units wherein projections are arranged in box-like casings having screens on one end faces thereof respectively so that the screens are arranged in one plane to constitute a large screen and images are projected from the respective projections to a back surface of the large screen, the assembling system comprising a frame unit having an outer size entirely enclosing the projection image units and a crane disposed on the frame unit to be movable in back and forth and lateral directions and adapted to elevate the projection image units.

According to this invention of the characters described above, in one aspect, weight of a group of projection image units piled up on a horizontal frame can be supported by the horizontal frame, and by arranging the horizontal frame for every appropriate number of projection image units in vertical direction, load can be dispersed. At the same time, warping of the horizontal frame can be prevented by vertical frames, so that displacement of screens due to warping of horizontal frames can be prevented.

In another aspect, not only the upper face, but also four faces in every direction are narrower than outside dimensions of a screen, so that, when arranged in matrix, a clearance can be provided between each of four faces of a casing and an adjoining unit in every direction. Because of this feature, spaces through which vertical frames and horizontal frames are extended can be formed, which is effective for forming a large screen with many projection image units.

According to a further aspect, an assembling system for assembling a projection image system includes an outer frame body and a crane which can move back and forth and in lateral direction on the frame body and lift up and down projection image units, so that projection image units can form a large screen in a manner piled in matrix, thus a large screen being formed easily.

DESCRIPTION OF THE PREFERRED EMBODIMENTS

Figure 1:
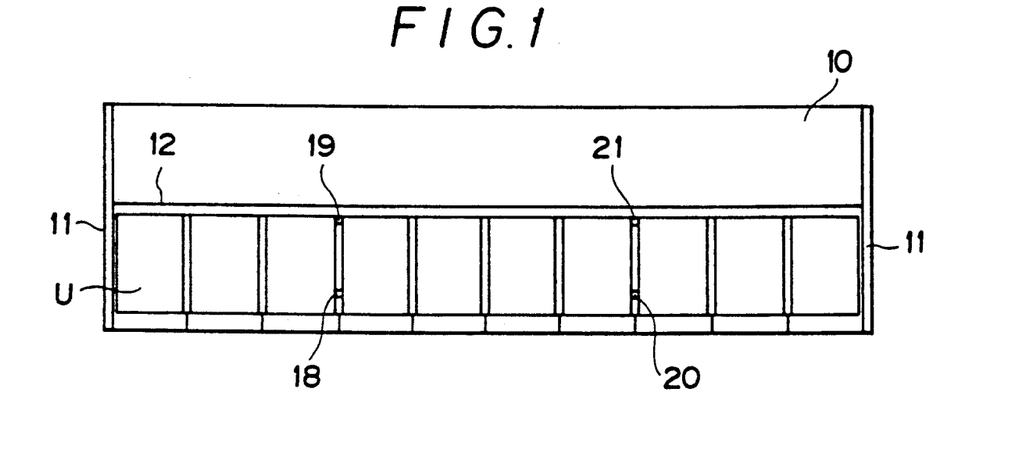
FIG. 1 is a plan view showing an embodiment of a projection image system according to this invention.
Figure 2:
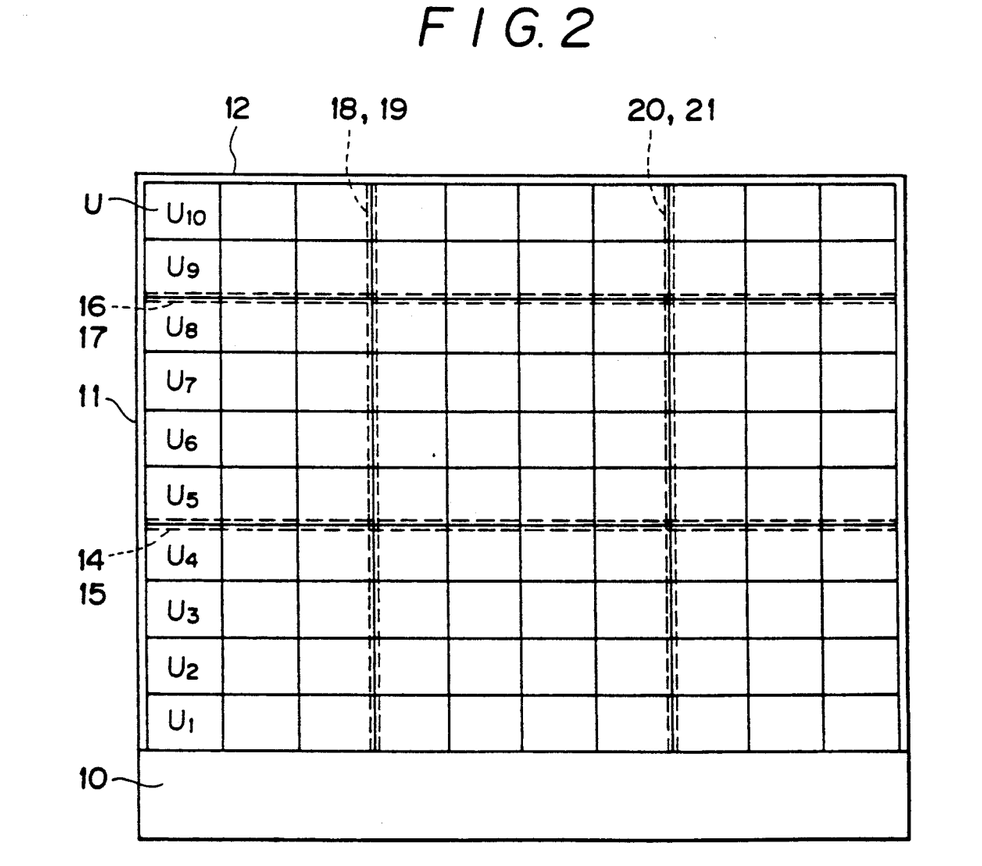
FIG. 2 is an elevation of the system of FIG. 1.
Figure 3:
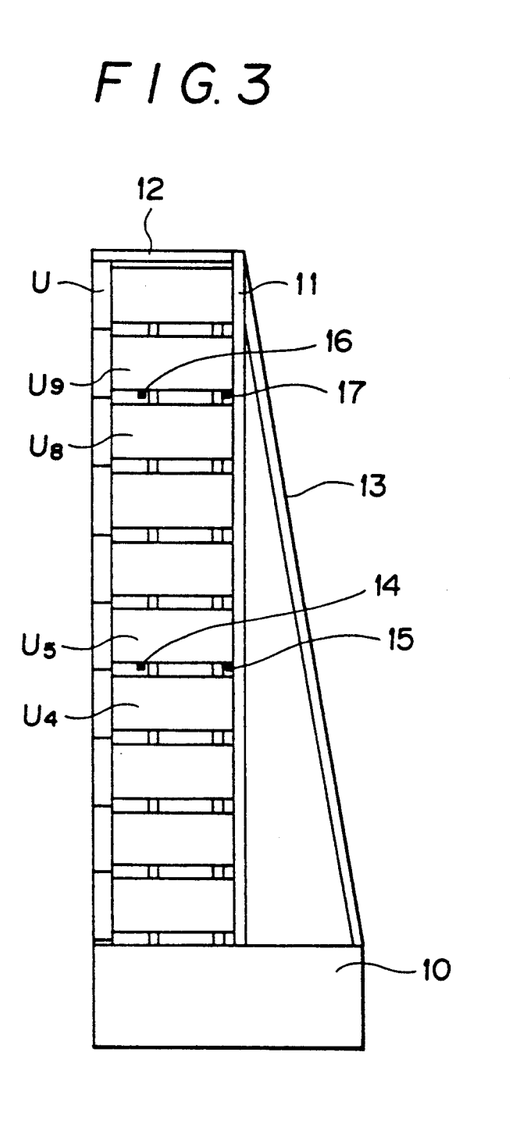
FIG. 3 is a side view of the system of FIG. 1.

FIGS. 1 through 3 show an embodiment of a projection image system according to this invention wherein a large screen has been formed. Referring to FIGS. 1 through 3, the screen is constructed by a basement 10, side frames 11 arranged at both side edges of the basement 10 and an upper frame 12 arranged between top edges of the side frames 11 to form a frame body. Inside a space enclosed by the basement 10, side frames 11 and the upper frame 12 are arranged a plurality (100 pieces in FIG. 2) of projection image units U in matrix. All of the projection image units U are arranged so that all of the screens 2 are in the same plane.

Between the side frames 11, two horizontal support frames 14 and 15, each extending through a clearance in vertical direction between projection image units U4 and U5 arrayed in horizontal direction, are arranged between a group of projection image units U4 in the fourth stage and a group of projection image units U5 in the fifth stage. Similarly, two horizontal support frames 16 and 17 are arranged between a group of projection image units U8 in the eighth stage and a group of projection image units U9 in the ninth stage. The horizontal support frames 14 and 15 support load of groups of projection image units U5 to U8 in the fifth to eighth stages, while the horizontal frames 16 and 17 support load of a group of projection image units U9 in the ninth and a group of projection image units U10 in the tenth units. Furthermore, between the basement 10 and the upper frame 12 are arranged vertical support frames 18, 19, 20 and 21 disposed, with a predetermined space, between the two adjoining projection image units in the horizontal direction. The vertical support frames may be arranged between every column of the horizontally arranged projection image unit. The vertical support frames 18, 19, 20 and 21 are connected to the horizontal support frames 14, 15, 16 and 17 at each crossing point respectively, thus helping the horizontal support frames 14 through 17 to support the weight loaded thereto. For this reason, the vertical support frames 18 through 21 prevent the horizontal support frames 14 through 17 from being warped due to the weight of groups of projection image units placed thereon. The effect by the vertical support frames 18 through 21 prevents the horizontal frames 14 through 17 from being warped and generation of clearances due to displacement of each of the screens 2, which often occurs at the central portion, can thus be prevented. The horizontal support frames 14 and 15 contact only bottom surfaces of a group of projection image units in the fifth stage, and similarly the horizontal support frames 16 and 17 contact only bottom faces of a group of projection image units U9 in the ninth stage. In other words, the horizontal support frames 14 and 15 do not contact the upper surfaces of the projection image units U4 in the fourth stage, and the horizontal support frames 16 and 17 do not contact the upper surfaces of the projection image units U8 in the eighth stage. This configuration prevents weight of projection image units in the upper stages from being loaded to the lower stages. In this configuration, weight of projection image units U1 in the first stage through projection image units U4 in the fourth stage is borne by the basement 10, weight of projection image units U5 in the fifth stage through projection image units U8 in the eighth stage is borne by the horizontal support frames 14 and 15, and weight of projection image units U9 in the ninth units and projection image units U10 in the tenth stage is borne by the horizontal frames 16 and 17. As a result, a large screen can be formed, keeping strength of a projection image unit U against compressive load as it is. The horizontal support frames may be disposed between every stage of the vertically arranged projection image units.

It is preferable that the basement 10 and the vertical support frames 18 through 21 are made of metallic material such as iron, and that square type pipe, H-type steel and I-type steel are available as material for the horizontal support frames 14 through 17 and the vertical support frames 18 through 21.

Figure 4:
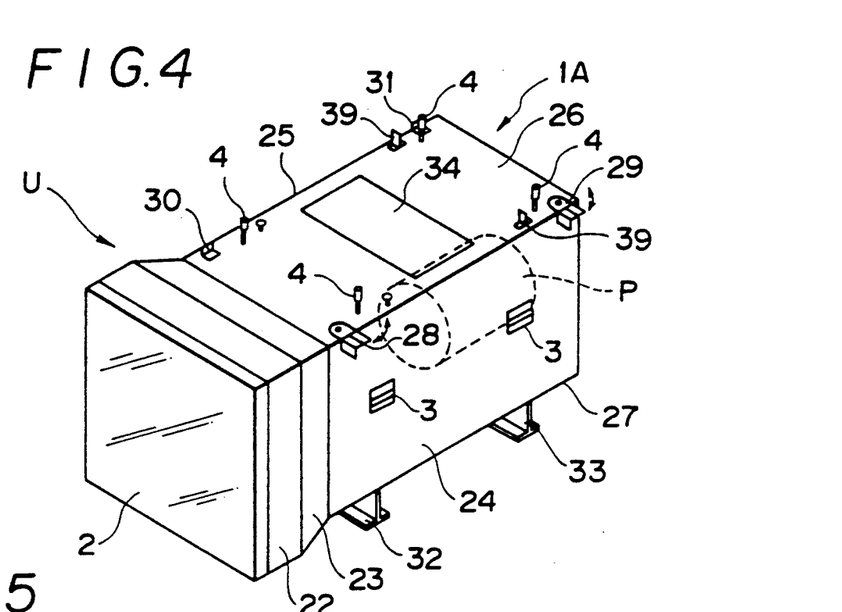
FIG. 4 is a perspective view showing an embodiment of a projection image unit according to this invention.
Figure 5:
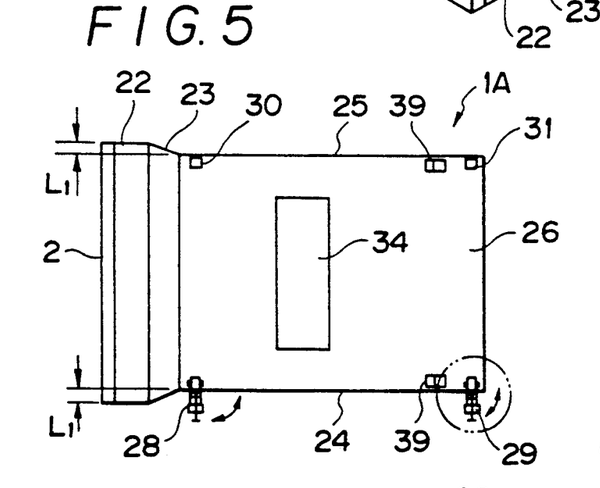
FIG. 5 is a plan view of the unit of FIG. 4.
Figure 6:
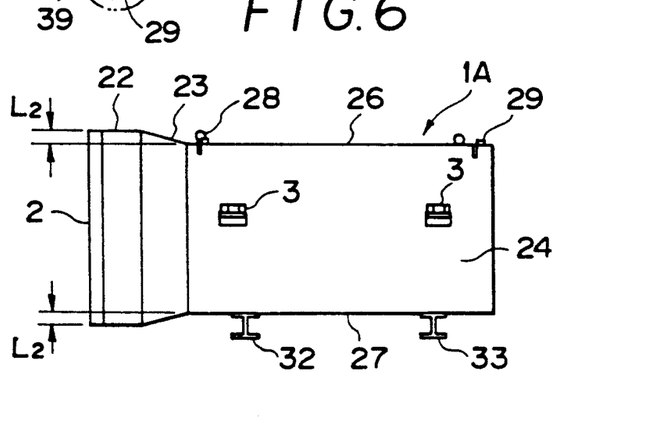
FIG. 6 is an elevation of the unit of FIG. 4.
Figure 7:
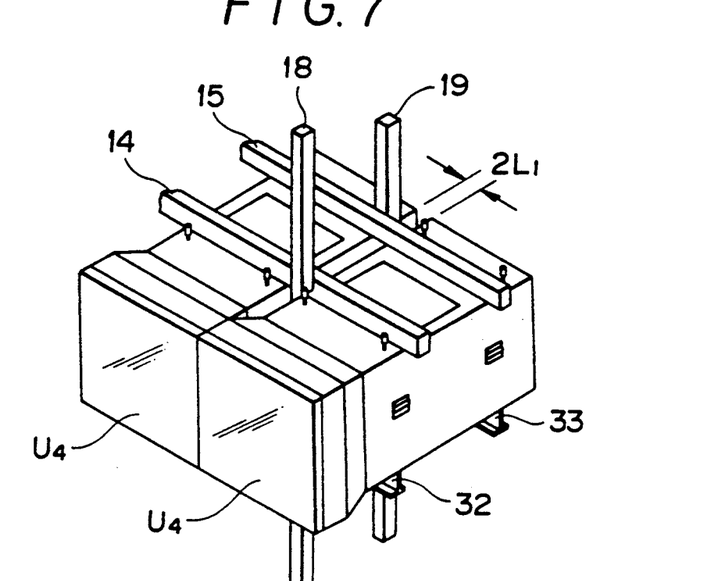
FIG. 7 is a partially enlarged perspective view showing connection in a horizontal support frame and a vertical support frame for the unit of FIG. 4.

FIGS. 4 through 6 show an example of the projection image unit U, in which FIG. 4 is a perspective view of the projection image unit U, FIG. 5 is a plan view thereof, and FIG. 6 is an elevation view thereof and the same reference numerals are added to elements or members corresponding to those in FIG. 26.

This projection image unit U is characterized in that outside dimensions of a casing 1A having a projector P thereon are smaller than outside dimensions of the screen 2 so that the unit U expands toward the screen 2 through a connecting wall 23 between the screen 2 and the casing 1A. In other words, as shown in FIG. 5, a lateral width of the casing 1A is narrower by $2L_1$ than that of the screen 2 and a height of the casing 1A is lower by $2L_2$ than that of the screen 2, thus a vertical cross-section of a space defined by a side wall 24, a side wall 25, a top wall 26 and a bottom wall 27 being made smaller than an area of the screen 2. Because of this configuration, when the projection image units are linked with each other in every direction, clearances with the width of $2L_1$ or $2L_2$ are formed between the casings 1A of adjacently facing projecting image units U.

The screen comprises two sheets of lens, i.e. a Fresnel lens inside and a lenticular lens on the surface, as in the conventional screens.

On the side walls 24 and 25 of the casing 1A are arranged a plurality of handles 3. On the top wall 26 of the casing 1A are arranged a plurality of rings 4 for hanging the casing 1A, and two connecting fittings 28 and 29 are arranged at one end of the casing 1A, while two steps 30 and 31, which form a pair with the corresponding connecting fitting 28 and the connecting fitting 29 respectively, are formed at another edge of the casing 1A. On the outside surface of the bottom wall 27 of the casing 1A are arranged two legs 32 and 33, each extending in the direction traversing the casing 1A. These legs 32 and 33 also serve as spacers for projection image units linked in the vertical direction. A door 34 for maintenance is also provided for repairing the projector P and other components accommodated in the casing 1A.

When a surface of a screen support frame 22 and a surface of other screen support frame 22 are put together to connect the projection image units U in matrix as shown in FIG. 1, a clearance with the width of $2L_1$ is generated between adjoining projection image units, for instance, between projection image units U4, so that the vertical support frames 18 and 19 can be inserted through the clearance $2L_1$. The vertical support frames 18 and 19 and the horizontal support frames 14 and 15 crossing each other at right angles are connected by using bolts and nuts, or by drilling unloaded holes in the vertical support frames 18 and 19 and arranging tapped holes in the horizontal support frames 14 and 15 for tightening with bolts.

Figure 8:
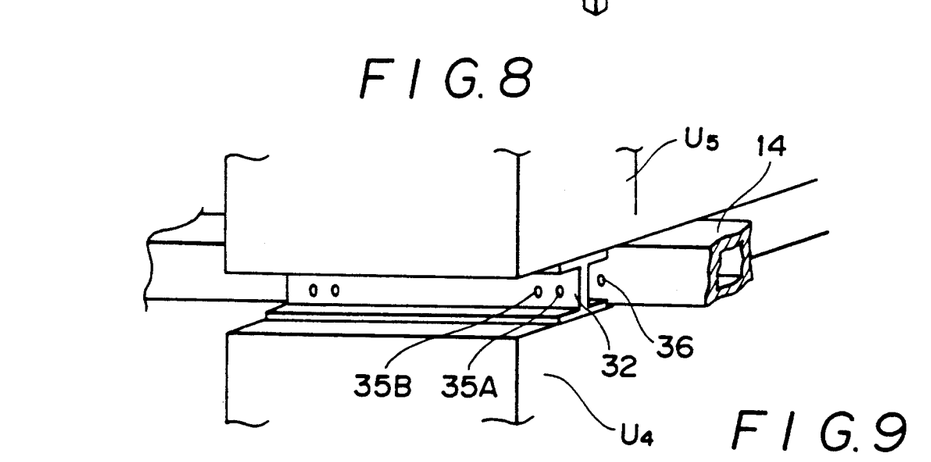
FIG. 8 is a partially enlarged perspective view showing a state where a leg and a horizontal support frame for the unit of FIG. 4 are fixed.
Figure 9:
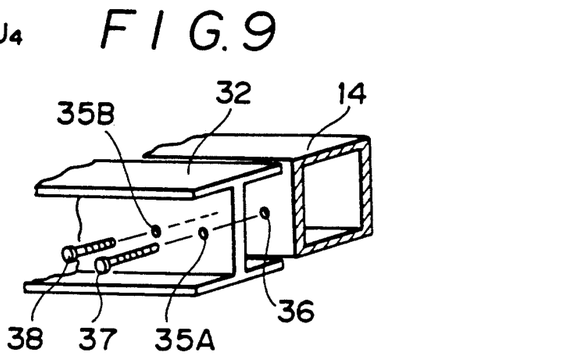
FIG. 9 is a partially enlarged perspective view showing a mechanism to fix and adjust the leg and the horizontal support frame.

On the other hand, for instance, the horizontal support frame 14 and the leg 32 are fixed with a plurality of fastening bolts 37 and 38, which also serve for adjusting alignment of surfaces of screens 2, as shown in FIGS. 8 and 9. Namely, the fastening bolts 37 and 38 are screwed into the corresponding screw holes 35A and 35B, wherein the screw holes 35A is an unloaded hole, the screw hole 36 is a tapped hole, and the screw hole 35B is a tapped hole. In this configuration, when the fastening bolt 37 is tightened, as the fastening bolt 37 goes into the screw hole 36, the leg 32 is pulled toward the horizontal support frame 14, but if the fastening bolt 38 is screwed into the screw holes 35B and tightened, as the fastening bolt 38 presses the horizontal frame 14, the leg 32 goes back from the horizontal support frame 14. By adjusting the fastening amounts of the fastening bolts 37 and 38, a position where the projection image unit U5 goes to or goes back from, i.e. a position of the screen 2, is determined and then fixed.

Figure 10:
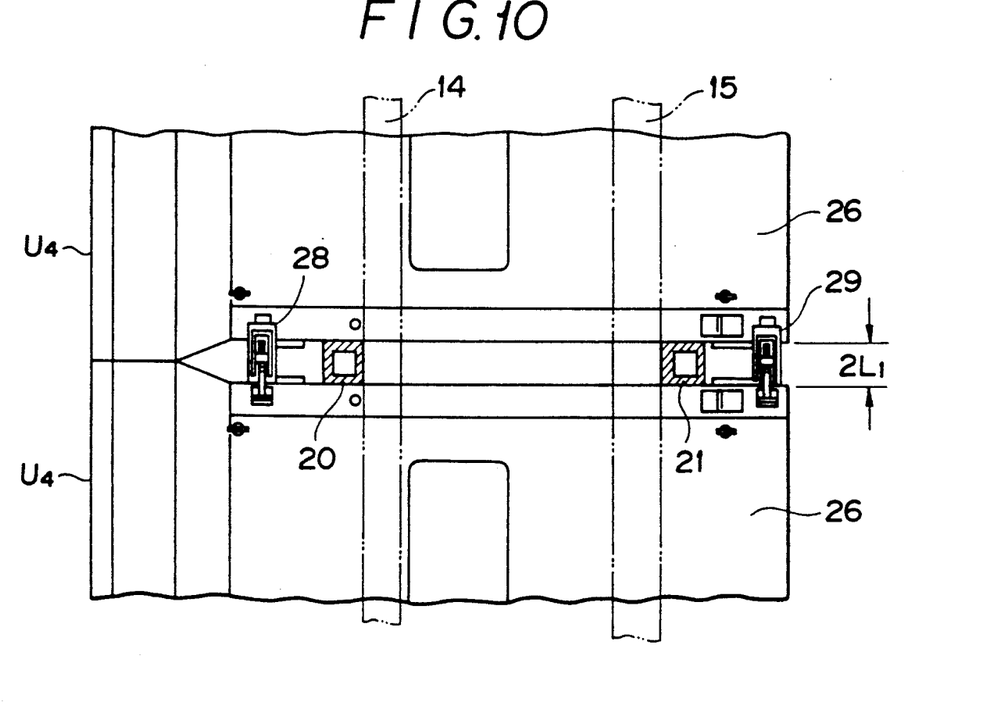
FIG. 10 is a partially enlarged plan view showing arrangement of horizontal frames and vertical frames.
Figure 11:
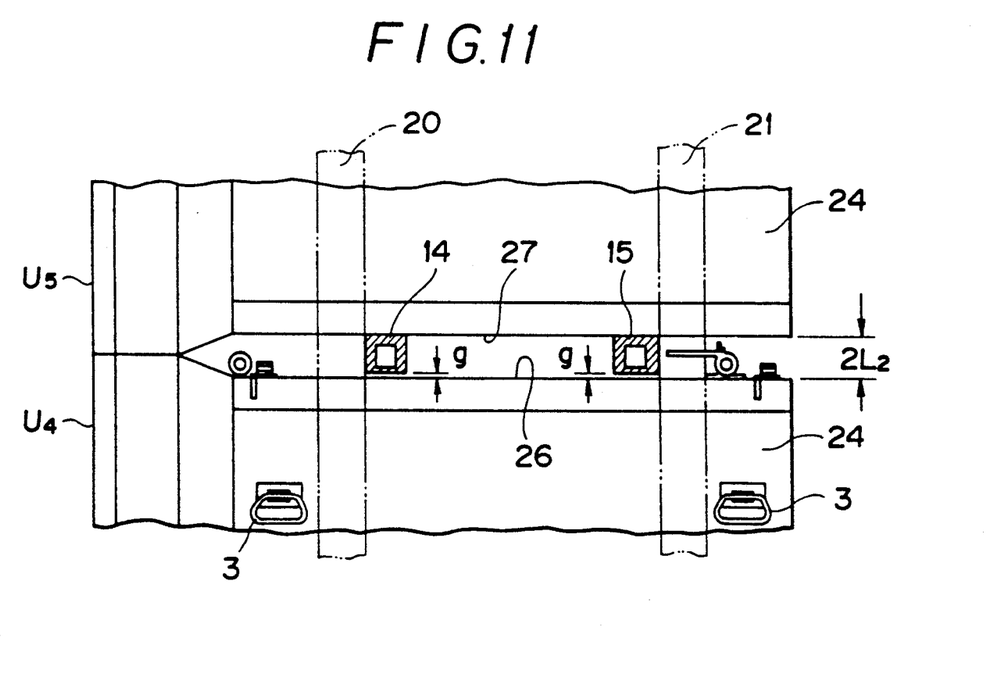
FIG. 11 is a partially enlarged elevation of FIG. 10.
Figure 12:
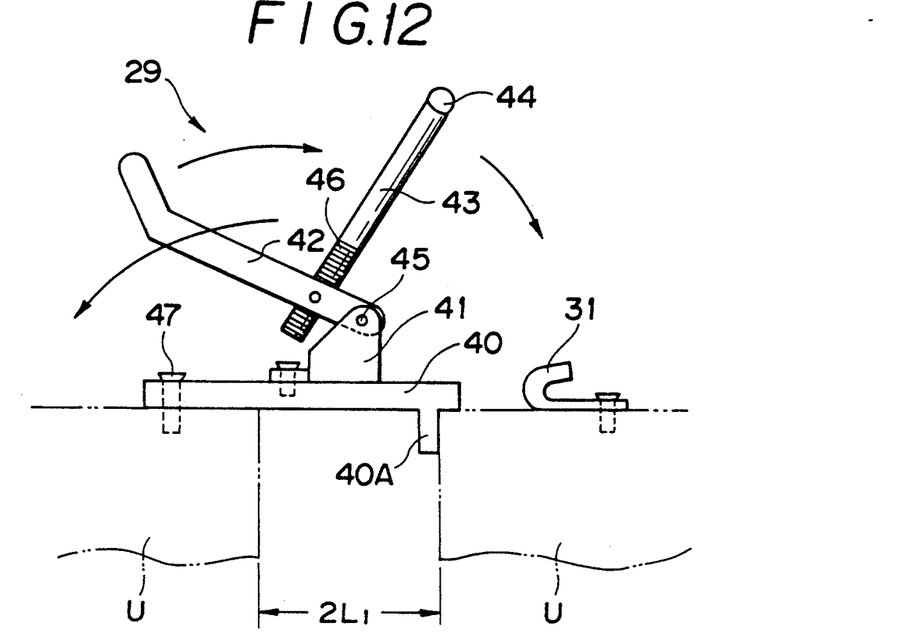
FIG. 12 is a front view showing a connecting fitting for the unit.
Figure 13:
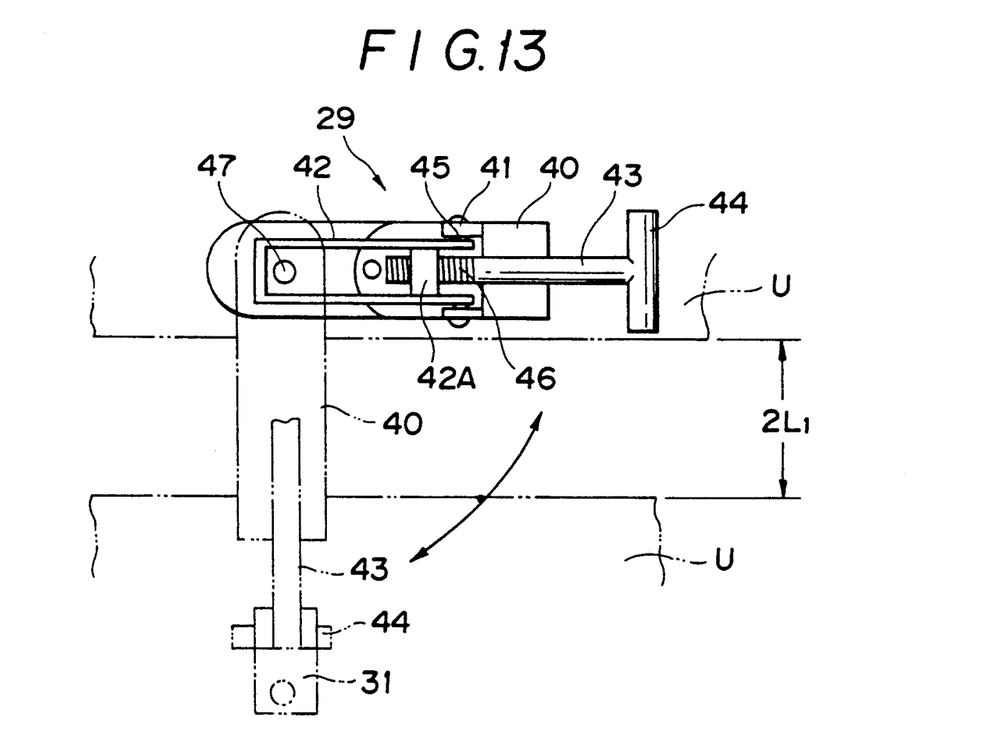
FIG. 13 is a plan view of FIG. 12.

FIG. 10 is a partially enlarged view showing connection of the projection image units U4 in the horizontal direction, while FIG. 11 is partially enlarged view showing connection in the vertical connection between the projection image unit U4 and the projection image unit U5. Referring to FIGS. 3 and 11, the vertical support frames 20 and 21 are inserted through the clearance $2L_1$ between the projection image units U4, and the horizontal support frames 14 and 15 are inserted through the clearance $2L_2$ between the projection image unit U4 and the projection image unit U5. As described above, the horizontal support frames 14 and 15 do not contact projection image unit U4, leaving a gap g therebetween. The reason for leaving the gap g is to prevent load of the projection image units U5 from being loaded to the projection image unit U4. As shown in FIG. 10, the projection image units U4 are connected with each other by a pair of connecting fittings 28 and 29 while leaving the clearance $2L_1$. An example of the connecting fitting 28 (or the connecting fitting 29) is shown in FIG. 12 and FIG. 13. The connecting fitting 29 is like a buckle and has a base plate 40 which can rotate in the horizontal direction around the connecting fitting 47 as a shaft. On the lower surface of the base plate 40 is arranged a protruding section 40A which contacts a side face of the projection image unit U and serves as a spacer to maintain the clearance $2L_1$. On the top face of the base plate 40 is arranged a pair of flanges 41, and an arm 42 is arranged on the flange 41 with a shaft 45 in a manner allowing rotation. Furthermore, a rod 43 is rotatably mounted to an intermediate portion of the arm 42. The rod 43 has a screw 46, which is screwed into the screwing section 42A of the arm 42. A thrusting length of the rod 43, i.e. a position of a locking rod 44, can be adjusted by rotating the rod 43 in the circumferential direction. The locking rod 44 protrudes in right and left directions, as viewed, to form a T-shaped construction with respect to the rod 43 and engages with a receptacle fitting 31 on the adjoining projection image unit U. When connecting the adjoining projection image units U with each other, as shown in FIG. 13, the connecting fitting 29 is entirely rotated by 90° in the horizontal direction and then the arm 42 is erected with the rod 43 extended to be engaged with the receptacle fitting 31. The arm 42 is then fallen down, thus the projection image units U being pulled toward each other and fixed with the clearance $2L_1$ being kept.

Figure 14:
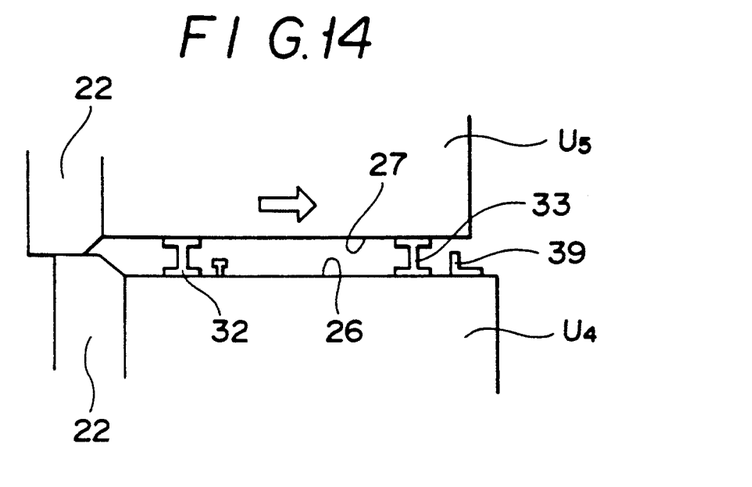
FIG. 14 is a partially enlarged elevation showing a way to pile up projection image units.
Figure 15:
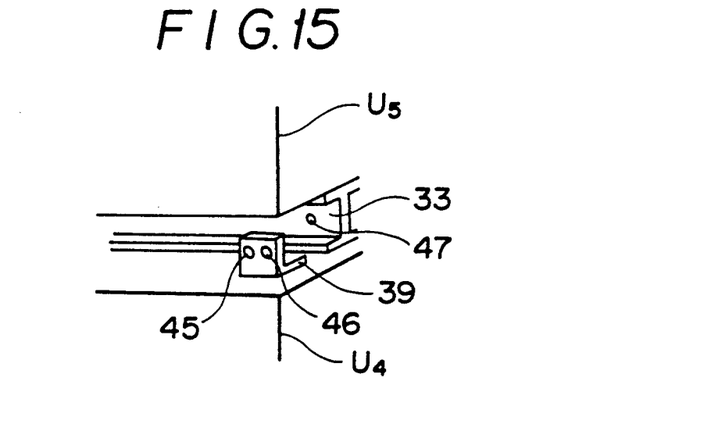
FIG. 15 is a partially enlarged perspective view showing a mechanism to fix and adjust the leg.
Figure 16:
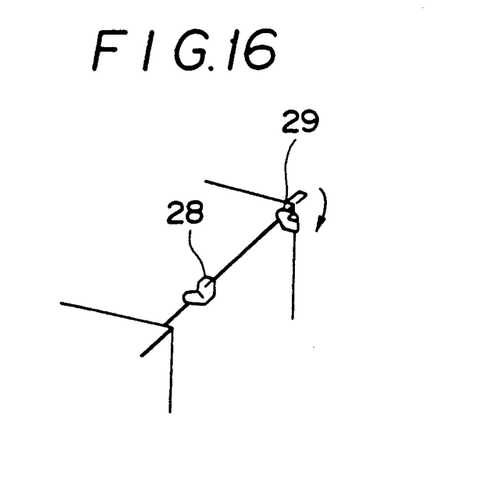
FIG. 16 and FIG. 17 are partially enlarged perspective views showing the connection sequence for the unit.
Figure 17:
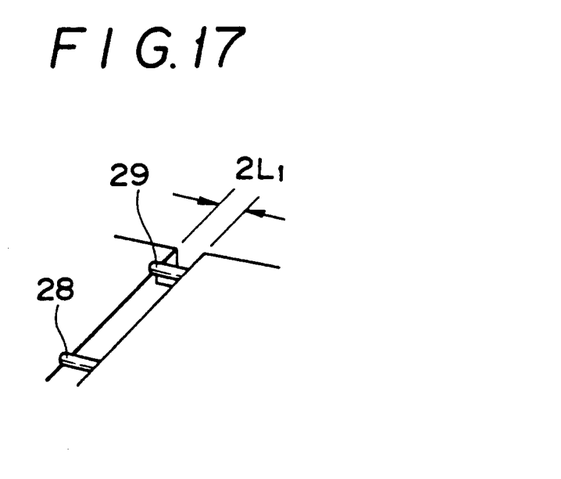

Next, description will be made below for a simple procedure for connecting the projection image units U4 when piling up the projection image units. At first, the projection image unit U5 is placed on a projection image unit in a lower stage, for instance the projection image unit U4, as shown in FIG. 14, by an appropriate apparatus (for instance, a forklift) so that the screen support frames are put together. Then, as shown in FIG. 14, the projection image unit U5 is displaced backward so as to come the leg 33 into contact with the fitting 39. Next, as shown in FIG. 15, a screw, not shown, is inserted into an unloaded hole 46 formed in the fitting 39 and is then screwed into a screw hole 47. Also a screw not shown in is screw into a shaft 45 which is a top hole. Thereafter, the projection image unit U5 is fixed by adjusting the position by means of a mechanism similar to that as shown in FIG. 9. Then, as shown in FIG. 16, the connecting fittings 28 and 29 are rotated and the projection image units U4 are connected by the mechanism shown in FIG. 13.

Figure 18:
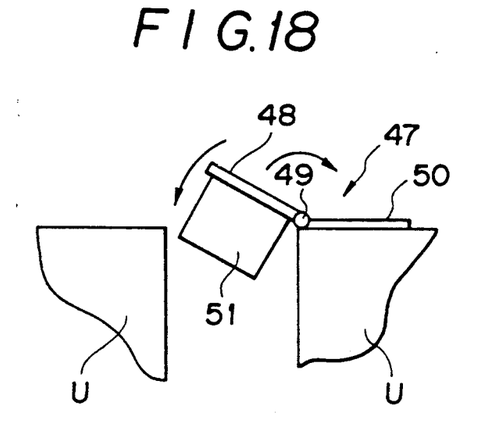
FIGS. 18, 19, 20 and 21 are front views showing another example of the connecting fitting.
Figure 19:
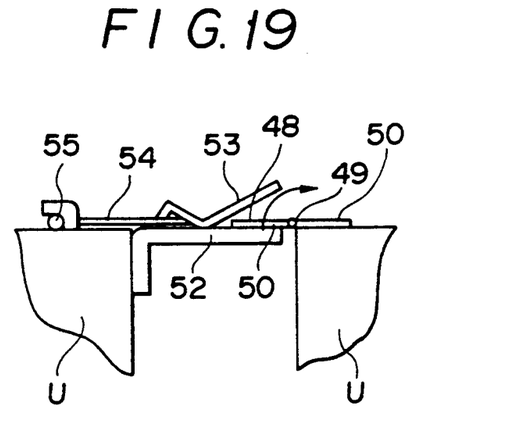
Figure 20:
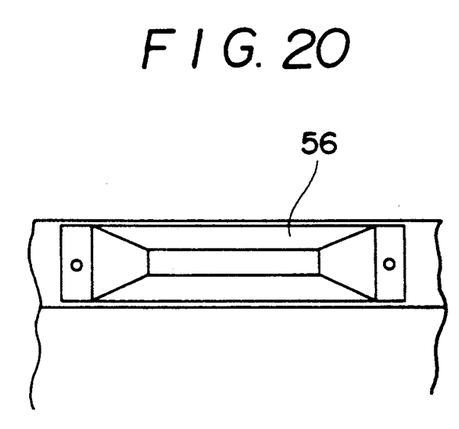
Figure 21:
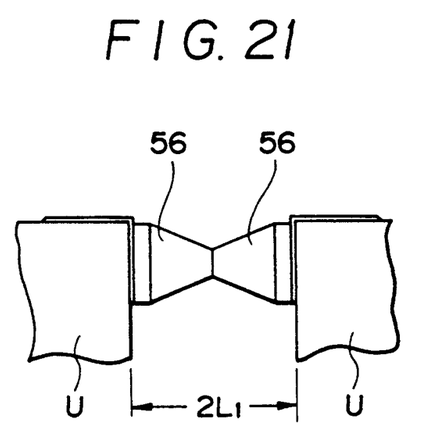

FIGS. 18 through 21 show other examples of the connecting fitting 28 (or the connecting fitting 29). FIG. 18 showns an example wherein the connecting fitting is mounted on a rear edge of a projection image unit U. In other words, a mounting section 50 is arranged at a rear edge of the projection image unit U, and a spacer 51 having the same width as that of the clearance $2L_1$ is mounted on a movable section 48 pivoted to the mounting section 50 with a hinge section 49. FIG. 19 is an example wherein the mounting section 50 is mounted at a rear edge of a projection image unit U, an L-type spacer 52 is mounted on the movable section 48 pivoted to the mounting section 50 with the hinge section 49, and a rod 54 and a locking rod 55 are arranged for the projection image unit U in a manner allowing engagement and separation of the respective image units in association with an arm 53. FIG. 20 shows a pad-formed spacer 56 having a tapered form. Two spacers 56 are disposed between the adjacent projection image units so as to contact side surfaces thereof as shown in FIG. 21. The reason why the spacer 56 has a tapered form is for preventing workers from carelessly holding the spacers 56 when transporting or installing the projection image unit U, because, during the work, workers often touch any protrusion and hence break the spacer.

Figure 22:
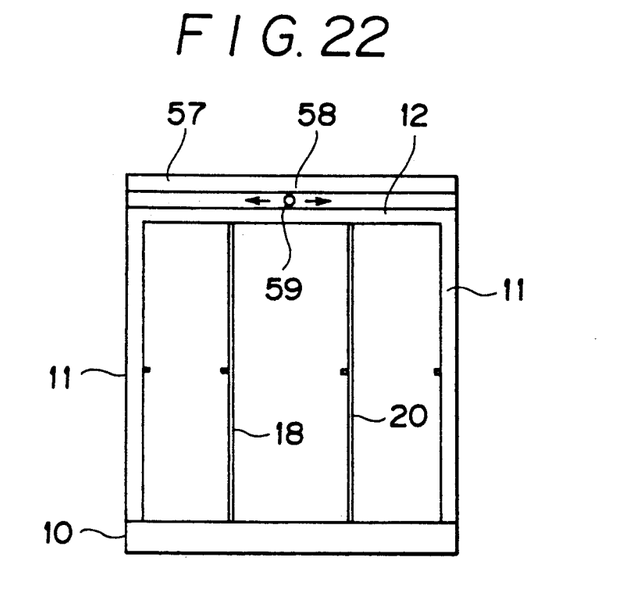
FIG. 22 is an elevation showing an embodiment of a projection image system assembling system.
Figure 23:
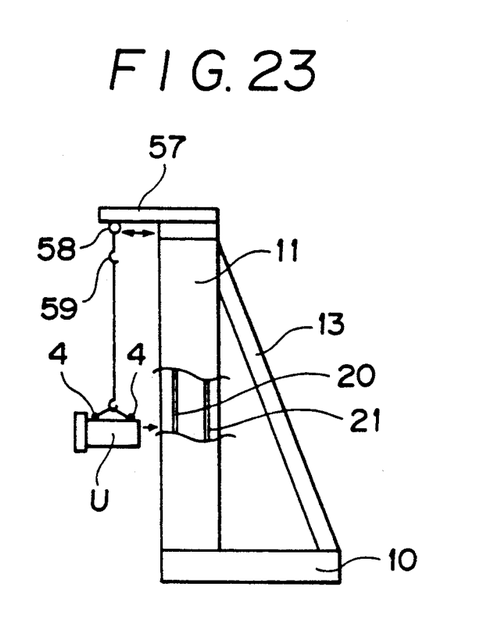
FIG. 23 is a partially broken side view of the assembling system of FIG. 22.

FIGS. 22 through 24 disclose a third embodiment according to this invention. This embodiment is characterized by the provision of a rail frame 57 and a crane 58 on a top surface of the upper frame 12. The rail frame 57 has a rail to guide the crane 58 back and forth and in right and left directions, and the crane 58 can be moved freely back and forth and in right and left directions with an appropriate controlling mechanism. The crane 58 is a so-called hoisting crane, which can lift up and down a projection image unit U with a hook 59, as shown in FIG. 23. The basement 10, side frame 11 and upper frame 12 are the same as those in FIGS. 1 through 3. However, when assembled indoors, an entrance is small and this frame body is hardly entered as it is. For this reason, by unitizing the basement 10, side frame 11 and upper frame 12 to a plurality of modules each with an appropriate size and assembling the modules with bolt and nuts, after transferred indoors its availability can be improved.

Figure 24:
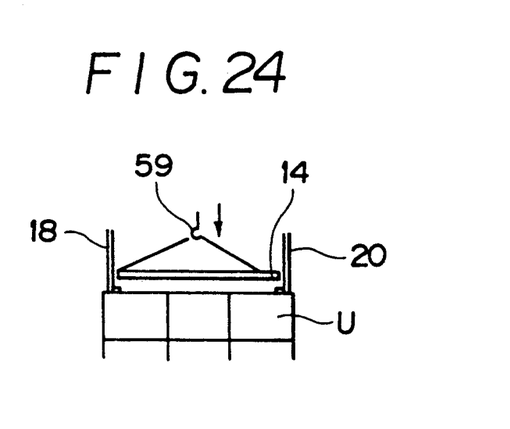
FIG. 24 is an elevation showing a way to install the horizontal support frames.

As for the work process, first the vertical support frames 18 and 20 are assembled, and when the projection image unit U hoisted by the crane 58 reaches a stage to be supported by the horizontal support frames 14 and 15, or the horizontal support frames 16 and 17, the horizontal support frame 14 is hoisted and arranged by the crane 58 and the hook 59, and subsequently the same work as this work is repeated.

Thus, as the rail frame 57 and the crane 58 are arranged above the upper frame 12, any specific handling machine such as a forklift is not required, and this integration of frames and an assembling system makes the assembly work easier.

What is claimed is:

1. A projection image system comprising:
   a plurality of projection image units each having a casing of box-like structure having a top, opposed sides, one end provided with a screen and a projector disposed inside the casing to project an image on a back surface of the screen;
   an outer unit enclosing the projection image units in a manner that the projection image units are piled in a matrix so that the screens of the respective projection image units are disposed in the same direction to form a large screen, said outer frame unit comprising vertical frames and horizontal frames constituting outer configuration of the outer frame unit;
   at least one horizontal frame member disposed between the vertical frames of the outer frame unit so as to extend horizontally through a gap formed between vertically adjacent projection image units;
   at least one vertical frame member disposed between the horizontal frames of the outer frame unit so as to extend vertically through a gap formed between horizontally adjacent projection image units;
   means for connecting the horizontal frame member and the vertical frame member at a crossing point thereof; and
   a spacer mounted at one side of said casing and rotatable into said gap formed between vertically adjacent projection image units.

2. A projection image system according to claim 1, wherein said projection image units are arranged in matrix having a plurality of vertical stages and a plurality of horizontal columns and wherein a plurality of horizontal frame members are disposed between every stage of the vertically arranged projection image units.

3. A projection image system according to claim 1, wherein said projection image units are arranged in matrix having a plurality of vertical stages and a plurality of horizontal columns and wherein a plurality of horizontal frame members are disposed between every several stages of the vertically arranged projection image unit.

4. A projection image system according to claim 1, wherein said projection image units are arranged in matrix having a plurality of vertical stages and a plurality of horizontal columns and wherein a plurality of vertical frame members are disposed between every column of the horizontally arranged projection image unit.

5. A projection image system according to claim 1, wherein said projection image units are arranged in matrix having a plurality of vertical stages and a plurality of horizontal columns and wherein a plurality of vertical frame members are disposed between every several columns of the horizontally arranged projection image unit.

6. A projection image system according to claim 1, wherein said horizontal frames of the outer frame unit comprises an upper frame a lower frame constituted as a basement.

7. A projection image system according to claim 1, wherein said connecting means is a bolt and nut assembly.

8. A projection image system according to claim 1 wherein said spacer includes a connecting fitting and is rotatably mounted on said casing top and further comprising a receptacle mounted on said casing top at the opposed side of said casing in correspondence with said connecting fitting, said connecting fitting being rotatable into engagement with the receptacle of an adjacent projection image unit so as to maintain said gap and maintain said screens in adjacent relationship.

9. A projection image system according to claim 1 wherein said spacer is mounted on a rear edge of said casing.

10. A projection image system according to claim 9 further comprising another spacer on said rear edge at the opposed side of said casing in correspondence with said spacer, said spacer and said another spacer having a combined length equal to the width of said gap between adjacent projection image units.

11. A projection unit comprising:
a screen having predetermined vertical and horizontal outer dimensions;
a box-like casing arranged behind a back surface of the screen and having top, bottom and side portions and an opening face directed to the back surface of the screen;
a projector accommodated in the casing so as to project an image on the screen;
said casing having a cross-section, parallel to the opening face, having outside dimensions in vertical and horizontal directions smaller than those of the screen so that when a plurality of casings are piled up in a matrix, a clearance is formed between one casing and each other casing adjacently arranged to the one casing in vertical and horizontal directions;
a spacer having a length corresponding to the clearance mounted on a side portion of the casing;
a connecting fitting mounted on one side of each casing at the top thereof and a receptacle mounted on the opposite side of each casing at the top thereof in correspondence with said connecting fitting, said connecting fitting being engageable with the receptacle of an adjacent casing whereby to link said casings and maintain said clearance between said casings in the horizontal direction; and,
a pair of spaced apart legs on said bottom portion extending from side to side, said legs having a vertical dimension equal to said clearance whereby to maintain said clearance in the vertical direction.

12. A projection image unit according to claim 11, wherein said spacer is mounted to be rotatable in a horizontal direction.

13. A projection image unit according to claim 11, wherein a connection fitting member is integrally formed with said spacer so as to connect casings of the projection image unnits arranged adjacently to each other in the horizontal direction.

14. A projection image unit according to claim 13, wherein said connecting fitting member is constructed to be rotatable by means of a hinge.

15. An assembling system for assembling a projection image system to constitute a large screen by piling up in a matrix a plurality of projection image units wherein projectors are arranged in box-like casings having screens on one end faces thereof respectively so that said screens are arranged in one plane to constitute a large screen and images are projected from the respective projectors to a back surface of the large screen, said assembling system comprising:
a frame unit having an outer size entirely enclosing the projection image units;
means disposed on a top surface of said frame unit to be movable in back and forth and lateral directions and adapted to elevate said projection image units;
each of said casings having top, bottom and side portions; a spacer having a length corresponding to a desired clearance mounted on a side portion of the casing;
a connecting fitting mounted on one side of each casing at the top thereof and a receptacle mounted on the opposite side of each casing at the top thereof in correspondence with said connecting fitting, said connecting fitting being rotatable into engagement with the receptacle of an adjacent casing whereby to link said casings and maintain said clearance between said casings in the horizontal direction; and,
a pair of spaced apart legs on said bottom portion extending from side to side, said legs maintaining said clearance between adjacent casings in the vertical direction.

16. An assembling system according to claim 15, wherein said means is a crane.

17. An assembling system according to claim 15, wherein said frame unit is constructed to be capable of being assembled and disassembled.

* * * * *